Figure 1:
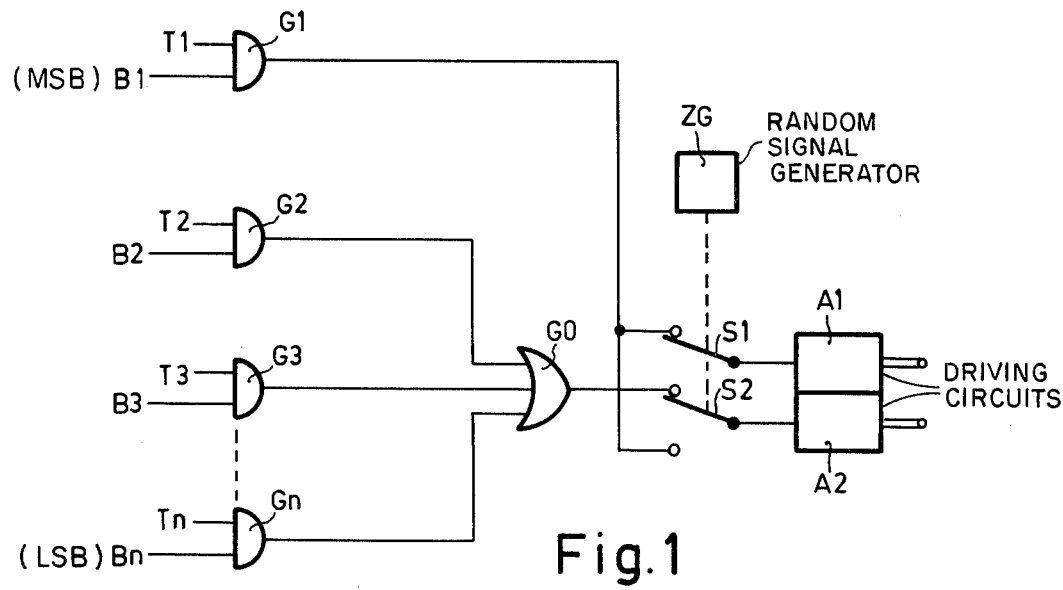

United States Patent [19]

Bunge et al.

[11] 4,033,443
[45] July 5, 1977

[54] LOGIC CIRCUIT FOR GREY-TONE PRINTER

[75] Inventors: Ernst Bunge, Hamburg; Ulf Rothgordt, Norderstedt; Bernd Ehlers, Tornesch; Herbert Piotrowski, Kaltenkirchen, all of Germany

[73] Assignee: U.S. Philips Corporation, New York, N.Y.

[22] Filed: July 17, 1975

[21] Appl. No.: 596,955

[30] Foreign Application Priority Data

July 22, 1974 Germany .......................... 2435090

[52] U.S. Cl. ...................... 197/1 R; 358/283
[51] Int. Cl.² ............................................ B41J 3/04
[58] Field of Search .............. 197/1 R; 178/6, 6.6, 178/5

[56] References Cited

UNITED STATES PATENTS

| | | | |
|---|---|---|---|
| 3,604,846 | 9/1971 | Behane et al. | 178/6.6 R |
| 3,863,023 | 1/1975 | Schmersal et al. | 178/6 |
| 3,919,464 | 11/1975 | Kondoh | 178/6 |
| 3,922,484 | 11/1975 | Keller | 178/6 |

Primary Examiner—Ralph T. Rader
Attorney, Agent, or Firm—Frank R. Trifari; Daniel R. McGlynn

[57] ABSTRACT

Method and apparatus for producing a grey-tone image having areas of different average density values which are given by an n-digit binary number, all the bits of the binary number being interrogated in parallel by clock patterns. For the area to be printed an elemental area containing $2^n$ pulses is selected which is printed in a total cycle of $2^n - 1$ clock pulses of the clock pattern. In this total cycle, at each clock pulse the drive of each pair of dots is determined in a manner such that the most-significant bit of the binary number is always used for driving while the remaining bits are used a number of times which depends upon their positional values. For this purpose, for each position of the binary number the clock pattern has a number of clock pulses which corresponds to the value of this position. The clock pulses for the individual positions are non-uniformly distributed in time, however, no clock pulses for the second and any further positions of the binary number coincide in time. Before each new print line the pattern will if required be shifted by additional clock pulses.

2 Claims, 4 Drawing Figures

LOGIC CIRCUIT FOR GREY-TONE PRINTER

The invention relates to a method of printing grey-tone images having areas of different average densities by means of a printer which successively prints dot lines which extend at right angles to the paper feed direction.

In many graphic and recording devices and printers printing is effected in that the graphic information to be displayed is composed of individual dots. These dots are produced in various manners, for example by printing needles driven electromagnetically or by charged pin-shaped electrodes which produce substantially dot-shaped charges on the paper which subsequently are developed and fixed. Each individual dot mostly provides a single density value only and no gradation for different grey tones. In order to produce images which have grey tones, i.e. areas of different densities, in the relevant area of the image not all the dots but, depending upon the desired density, only part of the dots are printed. Such grey-tone images are suitable, for example, when graphs of two independent variables are to be plotted, for example the variation with time of the spectrum in dynamic acoustic processes. In such a graph the variables have discrete values and the energy in plurality of frequency ranges is to be shown in individual period of time. Thus the image to be printed is composed of separate areas which each contain the same number of dots. The number of possible grey shades depends upon the individual areas and the possible number of dots therein. To obtain the impression of a substantially uniform grey value a largely random distribution of the dots to be printed in an area is required so as to prevent the occurrence of disturbing periodic structures. U.S. Pat. No. 3,604,846 is hereby incorporated by reference to show the art of generating binary signals to represent images, and dot-matrix printing mechanisms.

It is an object of the present invention to provide a method in which a density value in the form of a binary number is converted in the simplest possible manner into a dot pattern so that the number of the dots printed in the area is linearly associated with the binary number and the distribution of the dots in a substantially statistic manner is effected without disturbing periodicity of the dots printed. According to the invention this is achieved in that with a density value given by a $n$-digit binary number an elemental area containing $2^n$ dots is selected for each of a plurality of areas arranged in rows and columns, the binary number being so converted into two pulse patterns comprising a number of pulses equal to the value of the binary number in a total cycle of $2^n - 1$ clock periods that in the first pulse pattern when the mostsignificant bit of the binary number differs from zero a pulse is generated in each clock period while in the second pulse pattern for each other bit which differs from zero, pulses are generated in a number equal to the positional value of this bit, in the second pulse pattern the pulses generated for bits of different positional values do not coincide in time, the pulses of the two pulse patterns being used after each clock period for causing another dot pair from the elemental area to be printed.

The elemental area-appropriately is a rectangle and consists of lines which each comprise the same even number of dots, each said dot pair comprising two juxtapositioned dots in a line.

To approach even more closely to a statistical distribution of the printed dots, the association of the two pulse patterns with the dots of a dot pair can be interchanged in statistical sequence between the clock periods. The pulses for each bit of the binary number are generated in fixedly non-uniform distribution in time.

An apparatus for carrying out the method includes a clock pattern generator which has an output for each position of the binary number and the outputs except a first output generating a number of non-uniformly distributed clock pulses, which number corresponds to the positional value of the associated binary position. Each clock pulse output is connected to one input of an AND gate to the other input of which is applied the signal of the corresponding position of the binary number, the outputs of the AND gates delivering the signals for the circuits which cause the dots to be printed.

Figure 2:
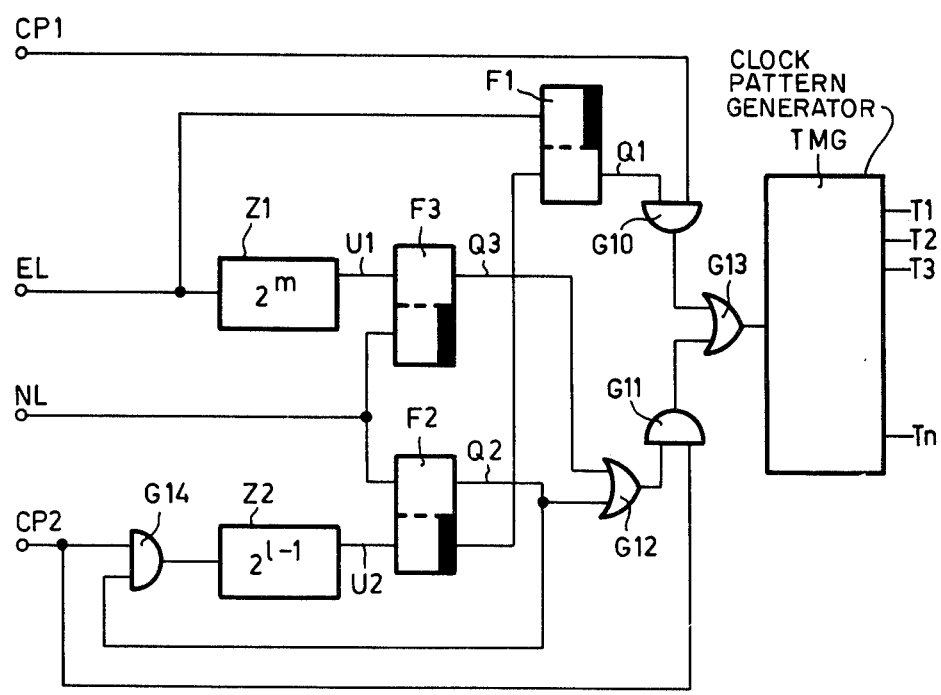
Figure 3:
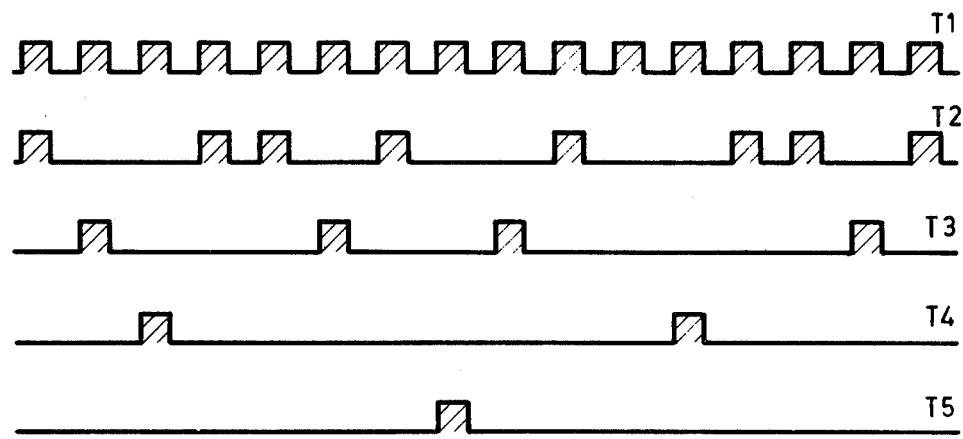
Figure 4:
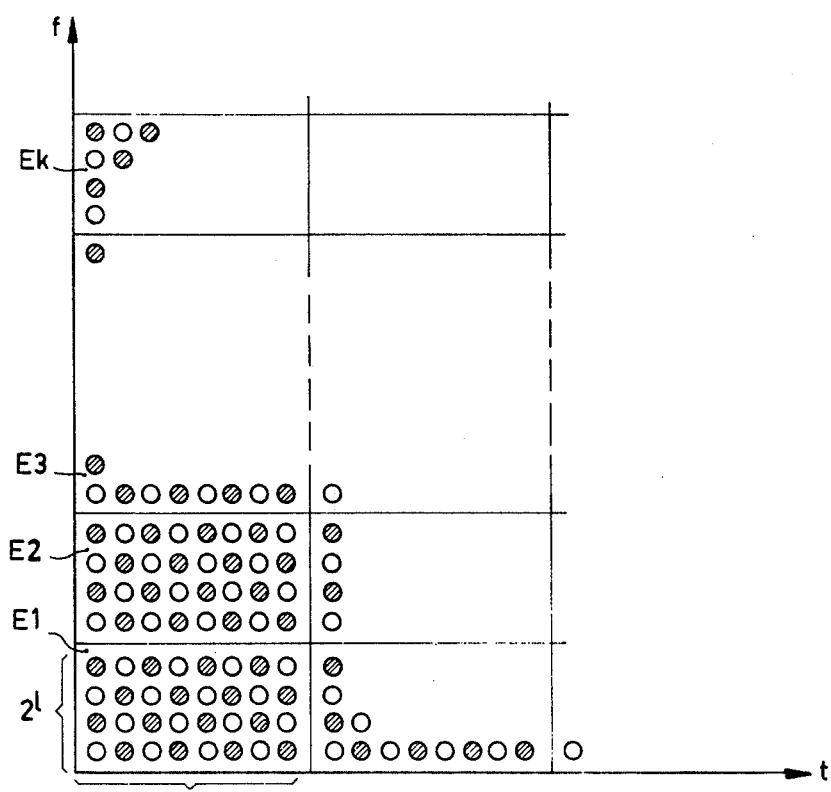

Embodiments of the invention will now be described, by way of example, with reference to the accompanying diagrammatic drawings, in which FIG. 1 is a block schematic diagram of an apparatus for converting the binary numbers into dot patterns, FIG. 2 shows the circuit arrangement for driving the clock pulse pattern generator which provides the clock signals for the apparatus of FIG. 1, FIG. 3 shows a clock pulse pattern of the clock pulse pattern generator, and FIG. 4 shows the structure and the arrangement of the elemental areas.

FIG. 1 shows AND gates G1, G2, G3, ..., G$n$ which each have two inputs, to one of which B1, B2, B3, ..., B$n$ respectively the signal of the corresponding position of a binary number is applied. Thus the signal for the most-significant bit of an $n$-digit binary number is supplied to the input B1, and the signal for the least-significant bit of the binary number is supplied to the input B$n$. This binary number may be supplied to the apparatus from outside, for example by a computer, or it may be stored in parallel in a store, not shown, of the apparatus. To the other input of the AND-gates G1, ..., G$n$ a clock signal T1, T2, ..., T$n$ respectively is applied which may be generated, for example, by a clock pattern generator TMG shown in FIG. 2 at the respective output. In the case of an $n$-digit binary number, for which accordingly each area contains $2^n$ dots which are printed in a total cycle of $2^{n-1}$ clock periods of a main clock signal CP1, the clock signal T1 comprises a pulse for each clock period of the main clock signal, the clock signal T2 on average comprises a clock pulse for every second clock period of the main clock signal, the clock signal T3 comprises on average one clock pulse for every fourth clock period of the main clock signal, and so on, and finally the clock signal T$n$ comprises only a single clock pulse in each entire cycle. The clock pulses in the individual clock signals T2 and so on are non-uniformly distributed in time, with the exception of the final clock signal T$n$ for which obviously non-uniform distribution is not possible. An example of such a clock pattern is shown in FIG. 3 for $n = 5$.

In FIG. 1 the output of the AND gate G1 provides a driving signal for one of two driving circuits A1, A2, and the outputs of the remaining AND gates G2, G3, ..., G$n$ are connected to an OR gate GO the output of which provides the driving signal for the other of the two driving circuits A1, A2. The two driving circuits A1 and A2, which each control the printing of a single dot, each have a change-over switch S1 and S2 respectively in their signal input path which when changed over interchange the connecting lines to the driving circuits A1, A2. The switches S1 and S2 are controlled by a random signal generator ZG the output signal of which is synchronized with the main clock CP1. The switches S1 and S2 appropriately take the form of electronic switches.

Because the output signals of the AND gates G2 to GD are all applied to the OR gate G0, it will be clear that the clock pulses in the clock signals T2, T3, ..., Tn must not occur simultaneously, because otherwise only a single dot would be printed for the simultaneously occurring clock pulses. A possible clock pattern is shown in FIG. 3 and comprises a total cycle of 16 ($=n^{n-1}$ with $n=5$) clock periods which consequently enables at most 31 ($=2^n-1$) dots to be printed in an elemental area.

The said clock pattern is generated in the clock pattern generator TMG which is shown in FIG. 2 and may be constructed in a usual manner as a binary counter with suitable decoding. During printing this clock pattern is controlled by a main clock signal CP1 which is applied to the clock pattern generator TMG via an AND gate G10 and an OR gate G13 and controls the printing operation from dot pair to dot pair or is synchronized therewith. Furthermore the clock pulse generator TMG has further clock signals (CP2) applied to it which are necessary because conventional dot printer, particularly electrostatic dot printers, do not complete the printing of an entire elemental area before beginning with the next entire elemental area, but print one row of dots after the other, which rows are corresponding rows of a sequence of juxtaposed elemental areas. This will be explained more fully with reference to FIG. 5.

FIG. 4 shows by way of example a graph in which amplitudes of a plurality of frequency ranges are plotted against time $t$. The paper is fed forward in the direction of the axis $t$ and printing is effected in the direction of the axis $f$. The elemental areas E1, E2, E3, ..., Ek are arranged side by side in the direction of the printing lines. Each elementary area contains $2^n = 32$ dots for $n = 5$ which are arranged in a rectangle the sides of which are $2^l = 4$ and $2^m = 8$ dots in length respectively, where $l = 2$, $m = 3$ and $l + m = n = 5$. Thus a 5-digit binary number can be linearly converted into density values. FIG. 4 corresponds with a grey-tone image with a medium grey gradation according to the binary number 10000.

Consequently in a printer which prints complete dot rows corresponding lines of the juxtaposed elemental areas E1, E2, E3, ..., Ek are printed consecutively. Because a line of each elemental area comprises 4 dots and hence two dot pairs only, printing of a line of an elemental area takes only a fractional part of the duration of the entire cycle of the clock pattern. Thus for the next elemental area the clock pattern commences at a corresponding different place; however, initially this is not of importance, because it is only required that in each elemental area the clock pattern is completely passed through once. If, however, the number $k$ of the juxtaposed elemental areas is equal to the line number $2^m$ or to an integral multiple thereof, at the beginning of a new printing line the clock pattern would always begin at the same place as for the preceding line, so that in each elemental area the same fraction of the clock pattern would always be traversed. A similar condition applies when the number $k$ of the elemental areas and the number of lines $2^m$ of each elemental area have a common denominator, for in this case given parts only of the clock pattern would repeatedly be traversed. If this is to be prevented, before a new printing line is begun the clock pattern in the clock pattern generator must be suitably shifted.

Thus at the beginning of a new row of elemental areas the clock pattern would start at the same place at which it began for the preceding row of elemental areas. If two elemental areas which succeed one another on the axis $t$ have the same binary value, i.e. the same density, a certain troublesome periodicity of the dot pattern would occur. To prevent such periodicity, at the beginning of a new row of elemental areas a statistically determined number of additional clock pulses is supplied to the clock pattern generator TMG of FIG. 2.

This is effected by the circuit arrangement shown in FIG. 2. Initially it is assumed that a flip-flop F1 is in a state such that the output signal Q1 with a logic 1 enables the AND gate G10 so that the main clock signal CP1 is supplied to the clock pattern generator TMG via the AND gate G10 and the OR gate G13. At the end of a complete line of dots a signal EL appears which resets the flip-flop F1 and advances a counter Z1 one position. As a result, supply of the main clock signal CP1 to the clock pattern generator TMG is interrupted.

At the beginning of a new line of dots a signal NL appears which resets a flip-flop F3, is not already in the reset state. Furthermore a flip-flop F2 is set so that via an OR gate 12 and an AND gate G11 a signal Q2 with a logic 1 enables an auxiliary clock signal CP2 to be supplied to the clock pattern generator TMG via the OR GATE 13. At the same time the signal Q2 also enables an AND gate G14 so that the auxiliary clock signal CP2 is also supplied to a counter Z2, which delivers an output signal U2 resetting the flip-flop F2. Because the capacity $2^{l-1}$ of the counter Z2 is equal to the number of dot pairs per line of an elemental area, at the beginning of a new line the clock pattern is thus shifted by the fractional part traversed during a line of an elemental area. Furthermore the reset of the flip-flop F2 causes the flip-flop F1 to be set again so that the output Q1 again applies the main clock signal CP1 to the clock pattern generator TMG. This occurs after each complete line of dots printed.

The capacity $2^m$ of the counter Z1 is equal to the number of lines per elemental area. Hence when an elemental area or a series of elemental areas has been printed, at the end of the last line the counter Z1 on reception of the signal EL produces an output signal U1 which sets the flip-flop F3. The outout signal Q3 of this flip-flop then via the OR gate G12 and the AND gate G11 enables the auxiliary clock signal CP2 to be applied to the clock pattern generator TMG, until the signal NL appears and resets the flip-flop F3 again. Because the spacing between the signals EL and NL fluctuates statistically, at the beginning of a new series of elemental areas the clock pattern generator TMG receives a statistically determined number of additional clock pulses. It is assumed that in the interval between the two signals EL and NL the auxiliary clock signal CP2 contains a large number of clock pulses. This auxiliary clock signal CP2 may have a materially higher frequency than the main clock signal CP1.

Thus it is ensured that the binary values are linearly converted into density values without the possibility of inconvenient periodicities occurring.

In the description AND and OR gates are used as logical gates. Also NAND and NOR gates could have been described. It is known that in dependancy of a positive or negative logic AND and NOR gates have the same logical function. The same applies for OR and NAND gates.

What is claimed is:

1. A logic circuit for a grey-tone image printer, comprising
    a clock pattern generator having a plurality of outputs, each of said outputs producing a distinct clock pulse pattern with a different predetermined number of clock pulses within a predetemined time interval;
    input means for supplying a digital representation of the density value of an image to be printed;
    a first and second group of AND-gates, each of said groups comprising at least one AND-gate, each of said AND-gates having a first input to a corresponding bit of said digital representation, a second input connected to a corresponding output of said clock pattern generator, and an output;
    an OR-gate, having a plurality of inputs connected to said outputs of said first group of said AND-gates, and an output;
    first and second driving circuits for printing a dot pair, having first and second inputs respectively for activation of the corresponding driving circuits, said first driving circuit for printing the first dot, and said second driving circuit for printing the second dot of said dot pair;
    a change-over switch, connecting said first and second inputs of said driving circuits with said output of said OR-gate, and said outputs of said second group of AND-gates; and
    means for switching said change-over switch comprising a random signal generator with a synchronized output.

2. The circuit as defined in claim 1, wherein said second group of AND-gates comprises a single AND-gate having a first input connected to the most-significant-bit of said digital representation.

* * * * *

UNITED STATES PATENT AND TRADEMARK OFFICE
CERTIFICATE OF CORRECTION

PATENT NO. : 4,033,443
DATED : July 5, 1977
INVENTOR(S) : ERNST BUNGE ET AL

It is certified that error appears in the above-identified patent and that said Letters Patent are hereby corrected as shown below:

Column 1, line 56, "mostsignificant" should be
--most-significant--

Column 3, line 1, "tively" should be --tively included--

Claim 1, line 21, "driving circuits" should be --driving circuit--

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*